Sept. 21, 1926.
A. H. DAVIES ET AL
Re. 16,426
PRODUCTION OF COLORING MATTERS
Original Filed Nov. 14. 1921
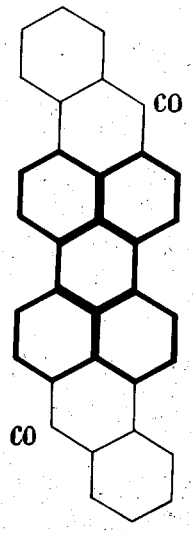
*Iso Dibenxanthrone*
A. H. Davies; R. F. Thomson and J. Thomas
INVENTORS
By: Marks & Clerk
Attys Reissued Sept. 21, 1926.

Re. 16,426

UNITED STATES PATENT OFFICE.

ARTHUR HUGH DAVIES, DECEASED, LATE OF WILLENHALL, ENGLAND; BY MARY OLIVIA DAVIES, ADMINISTRATRIX, OF WILLENHALL, ENGLAND, AND ROBERT FRASER THOMSON AND JOHN THOMAS, OF CARLISLE, ENGLAND, ASSIGNORS TO SCOTTISH DYES, LIMITED, OF CARLISLE, ENGLAND.

PRODUCTION OF COLORING MATTERS.

Original No. 1,531,260, dated March 24, 1925, Serial No. 515,086, filed November 14 1921. Application for reissue filed February 12, 1926. Serial No. 87,980.

This invention relates to the production of coloring matters either as dyes or intermediates for the production of dyes.

It has for its object to provide improved or new coloring matters. We have made a large number of experiments and have found, first, using isodibenzanthrone as a basis a class of bodies which class yield oxidation products, and second, that these oxy-derivatives may be submitted to the processes of alkylation (including arylation and alphylation) and acylation and that the bodies in both cases, that is, either the oxidation products or the alkyl or acyl derivatives, can act as dyes or intermediates for the production of dyes. We have discovered how to prepare these bodies and also how to apply them.

We have also found that the aforesaid oxidation products are capable of being reduced, but not necessarily back to the parent body, by such substances as sulphites.

Either the oxidation products or the reduced bodies can be made to yield under suitable conditions (examples of which are given below) acyl derivatives or alkyl derivatives, which bodies possess extremely valuable properties as dyestuffs.

We have also found that either the oxidation products or their alkylated or acylated derivatives can form additive compounds with sulphuric acid. These can be used as a means of isolating the required bodies as these sulphuric acid compounds are readily decomposed on treatment with excess of water giving the oxidation products or their derivatives in a form suitable for use in further reactions or themselves as dyestuffs.

The accompanying diagram represents in a conventional manner what may be regarded as the constitutional formulæ of isodibenzanthrone, the perylene ring system being shown in heavy lines.

The invention in brief consists in the production of coloring matters either as dyes or intermediates for the production of dyes from isodibenzanthrone, namely, by its oxidation, that product of oxidation being subsequently mildly reduced and either of the bodies treated for the introduction of organic radicles or inorganic radicles, particularly the alkyl derivative.

The following examples are given to illustrate methods for the production of oxidation products of the sub-class referred to above and their subsequent acylation or alkylation.

*Example A.*

10 parts of isodibenzanthrone are dissolved in 300 parts of strong sulphuric acid, along with 5 parts of crystalline boric acid. To the suspension is then added 12 parts of commercial manganese dioxide (87% purity). The mixture is then raised to a temperature of 60° C. for several hours. At the end of this time the product is isolated by pouring into a large excess of water, brought to the boil, and 20 parts of sodium bisulphite added. The mixture is boiled for 1 hour and filtered. The yield is 28 parts of a greenish-colored paste.

For utilizing this paste in one way, 14 parts of the paste of the above described oxidation product are suspended in 150 parts of nitrobenzene, and 10 parts of sodium carbonate added. The water is then distilled off and 10 parts of dimethyl sulphate added through a reflux condenser, after cooling to 150° C. The mixture is boiled for several hours during which a blue color develops. When the reaction is complete a test portion dyes cotton blue shades, which are no longer sensitive to acid and alkali. The coloring matter may be isolated by removing the nitrobenzene by steam distillation, followed by filteration and washing. The dyestuff may be used in this form directly, or may be submitted to further purification.

*Example B.*

25 parts of the paste of the oxidation product from isodibenzanthrone described in Example A containing 5 parts of solid and 10 parts of sodium carbonate are mixed with 150 parts of nitrobenzene and the water distilled off. 10 parts of dimethyl sulphate are then added and the mixture boiled under a reflux condenser until a test portion when dyed on cotton shows the alkylation to be complete; which is the case when the test dyeings are not changed in shade by acid or alkali. The progress of the reaction may be followed by the color of the suspension, which at first is red-violet in color, and changes to greenish-blue.

The methylated product may be isolated by filtering the hot nitrobenzol solution and washing the precipitate with hot nitrobenzene until all the dyestuff is removed; the filtrates are concentrated and the product allowed to crystallize. It separates in the form of a dark crystalline powder. This powder dissolves in strong sulphuric acid with a green color which on dilution yields a greenish-blue paste. It dissolves in alkaline hydrosulphite with a blue color, and dyes cotton from the vat blue shades, which on oxidation become greenish-blue. These shades are fast to the action of acids, chlorine and soaping treatment.

*Example C.*

The oxidation product of isodibenzanthrone may be purified by treatment with strong sulphuric acid in the manner described:—

10 parts of the oxidation product of isodibenzanthrone in the state of fine powder are dissolved in 400 parts of strong sulphuric acid at 60° C. The correct amount of water is now added to the solution to reduce the concentration of the sulphuric acid to 85%. After allowing to stand for 12 hours the mixture is filtered and washed with sulphuric acid of the same strength. The precipitate consists of a pure form of the oxidation product, and is worked up by diluting with water, boiling up, reducing with sodium bisulphite and filtering.

The purity of the product can be demonstrated by dye tests, and it is found that shades are obtained of a blue gray color, considerably more brilliant and intense than can be obtained from the crude product. The acid filtrates contain a further quantity of considerably less pure oxidation product. The shades obtained from the latter are considerably duller and weaker.

*Example D.*

To typify the action of other alkylating agents on the oxidation product of isodibenzanthrone, the following examples are given:—

5 parts of the oxidation product of isodibenzanthrone are suspended in 150 parts of nitrobenzene and 5 parts of diphenyl dichlormethane are added.

The solution on boiling assumes a blue color, and hydrochloric acid is evolved. When the latter ceases the color is worked up by the method of Example II of copending application No. 515,087.

The product is obtained after crystallizing as a dark crystalline powder, which dissolves in strong sulphuric acid with an emerald green color, giving on dilution a gray sulphate, and on further dilution a dull blue paste. It dissolves in alkaline hydrosulphite solution with a blue color, and dyes cotton blue shades, which on oxidation and washing become reddish blue.

These shades are fast to the action of acids and alkalies, and to bleaching and light.

In the preparation of the oxidation products of isodibenzanthrone we have mentioned the use of manganese dioxide and sulphuric acid, but other oxidizing agents such as nitric acid can be employed with suitable results. Isodibenzanthrone may also be nitrated, reduced, diazotized and boiled to form an oxy compound which behave in the manner described.

We have generally speaking found the reaction to proceed more rapidly and smoothly with the reduced derivatives than with the crude oxidation product but the alkylated or acylated products appear to be the same in both cases.

Having now described our invention what we claim as new and desire to secure by Letters Patent is:—

1. The process of producing coloring matters of the anthraquinone series which consists in the oxidation of isodibenzanthrone and the partial reduction of the product followed by the introduction of an organic radicle.

2. The process of producing coloring matters of the anthraquinone series which consists in the oxidation of isodibenzanthrone and the partial reduction of the product followed by the introduction of an alkyl radicle.

3. The process of producing coloring matters of the anthraquinone series which consists in the oxidation of isodibenzanthrone and the partial reduction of the product followed by the introduction of an alkyl radicle, the product being subsequently treated with strong sulphuric acid.

4. A process for the regeneration of an oxidation product from isodibenzanthrone which includes the step of preparing the sulphuric acid compound and treating the same with excess of water.

5. An oxidation compound of isodibenzanthrone.

6. As a new article of manufacture the coloring matter of the anthraquinone series obtained by oxidizing isodibenzanthrone and subsequently reducing the product.

7. As a new article of manufacture the coloring matter of the anthraquinone series obtained by oxidizing isodibenzanthrone, reducing the product and introducing an organic radicle therein.

8. As a new article of manufacture the coloring matter of the anthraquinone series obtained by oxidizing isodibenzanthrone, reducing the product and introducing an alkyl radicle therein.

In testimony whereof we have signed our names to this specification.

MARY OLIVIA DAVIES,
*Administratrix of Arthur Hugh Davies, deceased.*
ROBERT FRASER THOMSON.
J. THOMAS.